Feb. 27, 1923.
A. I. KENDALL
APPARATUS FOR OBTAINING FIBERS FROM FIBROUS MATERIAL
Filed June 1, 1920
1,446,974
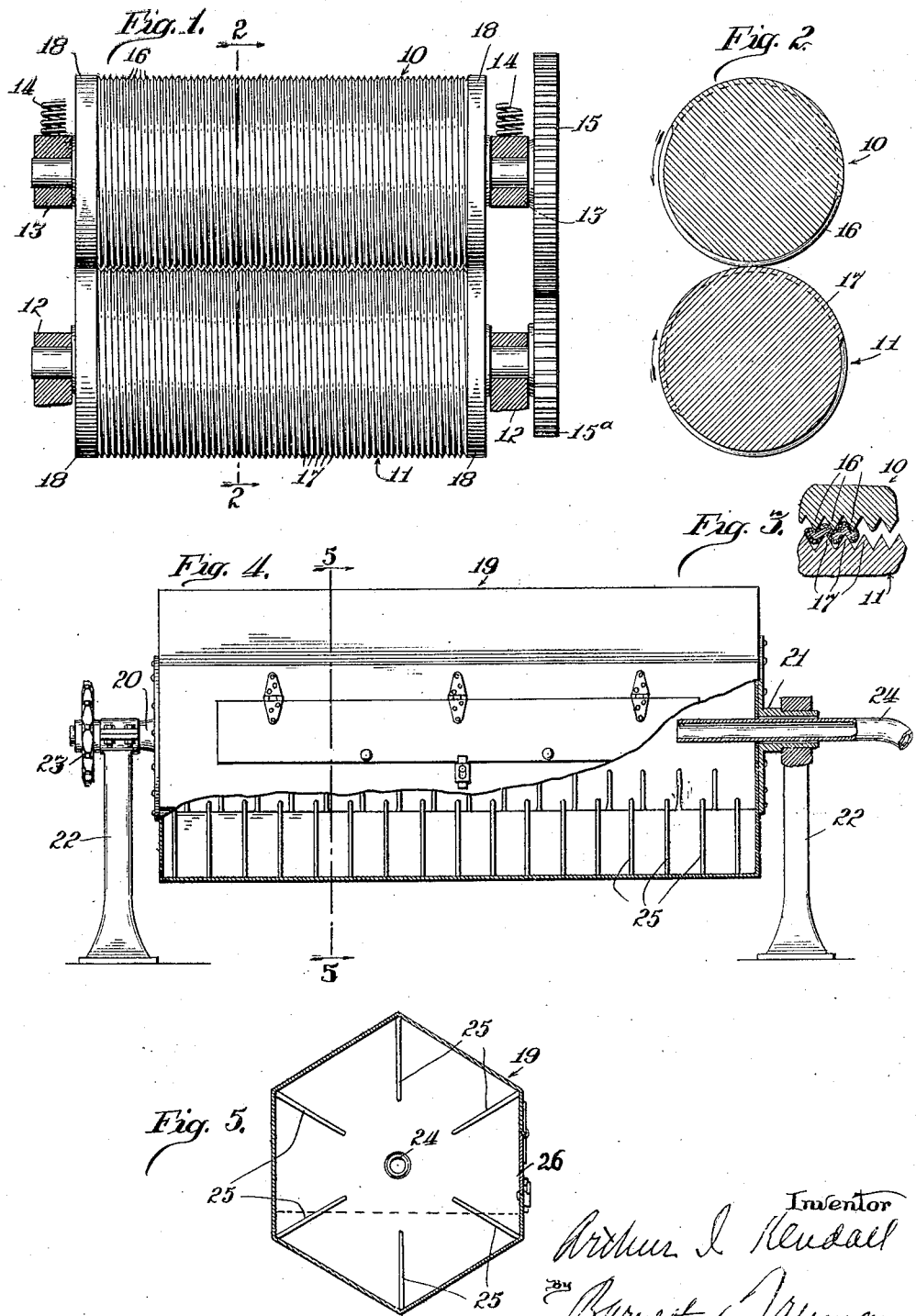

Patented Feb. 27, 1923.

1,446,974

UNITED STATES PATENT OFFICE.

ARTHUR ISAAC KENDALL, OF EVANSTON, ILLINOIS, ASSIGNOR OF ONE-HALF TO PHILIP R. SHUMWAY, OF EVANSTON, ILLINOIS.

APPARATUS FOR OBTAINING FIBERS FROM FIBROUS MATERIAL.

Application filed June 1, 1920. Serial No. 385,511.

*To all whom it may concern:*

Be it known that I, ARTHUR I. KENDALL, a citizen of the United States, residing at Evanston, in the county of Cook and State of Illinois, have invented certain new and useful Improvements in the Apparatus for Obtaining Fibers from Fibrous Material, of which the following is a specification.

My invention relates to certain improvements in the process of obtaining fibers for textile or other purposes from vegetable matter, such as flax.

One of the objects of the invention is to provide a novel method of making a separation, or a partial separation, by mechanical means of the fibrous from the non-fibrous constituents of the stalks or other material.

Another object is to provide a novel bacteriological or retting method for effecting this separation which may be employed either in connection with or independently of the mechanical method referred to.

According to the practice heretofore used for obtaining flax fibers, for example, from the stalks of the flax plant, the first step is to ret the material. There are three common methods of retting: The dew method, in accordance with which the vegetable matter is spread out upon the ground, bacterial action taking place through the moistening of the material by dew; stream retting, carried on in northern France and Belgium, in accordance with which the material is submerged in running streams; and the tank process which involves placing the material in tanks and allowing the same to stand for several days. All of these processes are objectionable because of the length of time which is required for the dissolving or partial dissolving of the pectic substances, and because of lack of uniformity of treatment of the material and the danger that by over treatment some or all of the fibers may be weakened. With the tank method the fibers are frequently darkened. The dew and stream retting methods require treatment of the material for several weeks. In the tank method the operation may take from ten days to a month. It has also been proposed to ret flax, hemp, ramie, and other fiber containing materials by sterilizing the same and inoculating the water in which they are submerged with pure cultures of certain pectic aerobic bacilli (see U. S. patent to Rossi No. 977,133, Nov. 29, 1910) in a closed vessel and passing a stream of sterilized air through the material, the treatment requiring, according to the patent, from three to twenty days' time and involving, as will be obvious, somewhat expensive and complicated apparatus and great care in its manipulation.

I have discovered that the operation of separating the pectic substances in fibrous materials may be performed in a certain manner, to be hereinafter described, which very much reduces the length of the period of treatment, in comparison with all previous methods, and does not involve the precautions and difficulties in handling the material attendant upon the pure culture method above referred to. The new method involves a mechanical shredding or separation of the fibers from the stalk and also a new way of retting. These operations may be performed one after the other on the same material, or each operation may be used without the other, depending upon the character of the material treated and the use to which the fibers are to be put. Preferably, however, when the material is retted it is first subjected to the shredding treatment as that treatment considerably facilitates the subsequent action of the bacteria by allowing the bacteria to come into closer contact with the fibers.

In accordance with this invention the materials, flax stalks, for example, are treated as follows: The stalks are preferably first crushed lengthwise of the fibers by passing the stalks end to end between rollers preferably formed so as to shred or pull the fibers apart. The crushed material is then submerged in soft water, preferably kept at a temperature from 85 to 95 degrees Fahrenheit, and a gentle movement of the water with respect to the material is brought about which effects the constant removal from the neighborhood of the material of the products of bacterial action. The water might be changed from time to time but I have not found that necessary. The gentle washing of the water over the material disperses the products of the action of the microbes throughout the entire body of water so as to prevent the inhibitive action of such by-products on the organisms and to allow them the freedom to continue their dissolving action upon the pectic substances. While it would be possible to inoculate the material with cultures of bacteria of the type suitable for doing this work, it is not at all necessary to do so inasmuch as the necessary organisms are placed by nature on the material in sufficient numbers to accomplish the retting operation in a relatively short time, provided the conditions under which their action takes place are favorable.

My invention is not confined to the use of any particular form of apparatus. In the drawing hereto annexed I have shown, in a diagrammatic manner, an apparatus suitable for the purpose. In the drawing, Fig. 1 shows, in elevation, a pair of rollers for carrying out the mechanical separation contemplated by my invention.

Fig. 2 is a sectional view on line 2—2 of Fig. 1.

Fig. 3 is a detail view, on an exaggerated scale, to illustrate the crushing and shredding operation performed by the rollers.

Fig. 4 is a side elevation, with parts in section, of the drum used for the retting or bacteriological step in the process, and Fig. 5 is a cross sectional view on line 5—5 of Fig. 4.

In Figs. 1, 2 and 3, 10, 11 represent a pair of rollers mounted in suitable bearings 12, 12 and 13, 13, the rollers being preferably pressed one against the other by springs 14 engaging the bearings 13 which are mounted so as to have slight movement. The rollers are driven in opposite direction by any suitable means and preferably at different velocities. As shown, the rollers are geared together by gear wheels 15, 15ª of different diameters. The rollers are formed with circumferential serrations 16 which are oblique or pitched. The serrations in each roller are preferably continuous, consisting in effect, of a thread extending spirally around the roller from a point near one end to a point near the other. The end portions of the roller are preferably left smooth so as to provide proper bearing surfaces 18 for one roller on the other. The serrations extend around the rollers in the same direction. The rollers, however, are driven in opposite directions and the result is that the movement of the flax stalks between the rollers is accompanied by a tearing or pulling apart of the fibers laterally since the serrations on one roller tend to move the material in one direction laterally, while the serrations on the other roller tend to move the material laterally in the other direction.

In Figs. 4 and 5, 19 designates a drum, preferably hexagonal in cross section, having trunnions 20, 21 revolubly supporting it on the standards 22. Trunnion 20 is provided with a sprocket wheel 23, or other means by which the drum may be revolved. The rate of revolution should be quite slow. The trunnion 21 is hollow and has projecting into the same a pipe 24 to carry off any gases produced by the action of the bacteria. The interior of the drum is provided with inwardly projecting fingers 25. These fingers keep the flax stalks substantially parallel and from becoming tangled. They also lift the flax stalks from the water as the drum revolves them, constantly removing the waste products in solution from the immediate vicinity of the material and keeping the material from packing. The material is placed in the drum, through an opening which is normally closed by means of door 26, together with water and the drum is revolved. For flax retting the operation will be completed ordinarily in from twenty-four to seventy-two hours, depending upon the character of the material treated.

The process of retting contemplated by this invention resembles somewhat the natural process of dew retting, but is superior because of the very considerable shortening of the period of treatment and the greater uniformity of bacterial action. The bacteria are the same organisms which act in dew retting. The treatment, however, is continuous instead of being intermittent. The action of the bacteria is more uniform than in dew wetting because there is a continuous dispersion of the products of bacterial action and a continuous movement of the material with respect to the bath which insures each stalk receiving the same treatment as every other stalk. The method does not involve any substantial decomposition of nitrogeneous substances as is the case in tank retting where the prolonged submersion of the material results in a proteolytic action. Hence there is no production of foul odors characteristic of the tank method of retting. The bacteria which accomplish the decomposition of the pectic substances appear to be facultatively anaerobic. It is not necessary to force air through the water. The amount of air naturally in the water is sufficient.

The method differs from the stream retting method in that in the latter the bacteria are being constantly carried away from the material by the current. It resembles stream retting in that it involves a similar dispersion of the products of bacterial action and the presence in the water of small amounts of dissolved air. The stream retting method, however, is slow and does not give uniform results because the effect of passing the current of water through the material is offset by the necessarily close packing of the material.

I claim:

1. In apparatus for retting fibrous materials, a rotatably supported drum provided with inwardly projecting fingers, in combination with means for revolving the drum.

2. In apparatus for retting fibrous materials, a rotatably supported drum provided with inwardly projecting fingers, in combination with means for revolving the drum, said drum being formed with a discharge pipe for gases generated during the retting operation.

ARTHUR ISAAC KENDALL.